United States Patent
Hosseini et al.

(12) 
(10) Patent No.: US 6,234,656 B1
(45) Date of Patent: *May 22, 2001

(54) FIBER OPTIC LUMINAIRE

(75) Inventors: Abbas Hosseini; Tomasz P. Jannson; Stephen A. Kupiec; Anatoly Vasiliev, all of Torrance, CA (US)

(73) Assignee: Physical Optics Corporation, Torrance, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/137,552

(22) Filed: Aug. 20, 1998

(51) Int. Cl.$^7$ ........................................... F21V 7/04
(52) U.S. Cl. ......................... 362/556; 362/558; 362/559; 362/560; 385/901
(58) Field of Search ...................... 362/559, 560, 362/551, 556, 558, 582; 385/901, 133, 147

(56) References Cited

U.S. PATENT DOCUMENTS

| | | | |
|---|---|---|---|
| 3,908,149 | * 9/1975 | Gergoe et al. | 315/84 |
| 5,027,259 | * 6/1991 | Chujko | 362/32 |
| 5,050,946 | 9/1991 | Hathaway et al. | 385/33 |
| 5,295,048 | 3/1994 | Park et al. | 362/26 |
| 5,390,276 | 2/1995 | Tai et al. | 385/146 |
| 5,394,255 | 2/1995 | Yokota et al. | 359/49 |
| 5,594,830 | 1/1997 | Winston et al. | 385/146 |
| 5,600,455 | 2/1997 | Ishikawa et al. | 349/57 |
| 5,600,462 | 2/1997 | Suzuki et al. | 349/112 |
| 5,791,757 | * 8/1998 | O'Neil et al. | 362/32 |
| 5,838,403 | 11/1998 | Jannson et al. | 349/65 |
| 5,894,539 | * 4/1999 | Epstein | 385/133 |
| 5,937,127 | * 8/1999 | Zarian et al. | 385/128 |

* cited by examiner

Primary Examiner—Stephen Husar
Assistant Examiner—John Anthony Ward
(74) Attorney, Agent, or Firm—Nilles & Nilles, S.C.

(57) ABSTRACT

A fiber optic luminaire is arranged to couple light energy from a light source along its length. The fiber optic luminaire includes a plurality of light redirecting structures distributed along its length; the light redirecting structures are arranged to uniformly distribute by reflection light energy from the fiber optic luminaire. The light redirecting structures are preferably non-scattering structures, including structures such as microprisms, microfacets, microgrooves and micrometers. The fiber optic luminaire may be configured to a variety of shapes and to provide customized light distribution patterns.

46 Claims, 5 Drawing Sheets

FIBER OPTIC LUMINAIRE

BACKGROUND OF THE INVENTION

1. Field of the Invention

The present invention relates generally to luminaires, and more particularly, to a fiber optic luminaire adaptable to many different configurations and having a controlled light distribution.

2. Description of the Related Art

Light conducting, light shaping and light distribution structures are known. For example, it is known to couple light energy along a fiber optic cable from a light source to a luminaire. The light source provides a source of light energy, and the luminaire is constructed to distribute the light energy with a desired intensity and in a desired pattern. The fiber optic cable provides a conduit for transporting the light energy from the light source to the luminaire. It is also known to provide light distributing fiber optic cable. Such fiber optic cable is adapted to scatter light energy outwardly from its surface as the light energy is coupled along the length of the fiber. Because these fibers scatter the light energy there is little or no control of the light energy distribution. Hence, the intensity of the light distribution varies substantially along the length of the fiber.

Light pipes too are devices that find application in light distribution applications. A light pipe is typically arranged to couple light energy from a light source along its structure. Additionally, the light pipe is arranged to distribute the light energy from its structure in a desired pattern. In this manner the light pipe acts both as the conduit and as the luminaire. Light pipes are typically adapted for a particular light distribution application. For example, a light pipe is shown in U.S. Pat. No. 5,050,946 for providing backlighting to a liquid crystal display (LCD). Similar arrangements are shown in U.S. Pat. Nos. 5,295,048; 5,394,255; 5,390,276; 5,594,830; 5,600,455 and 5,600,462. Another example of a light pipe application is instrument cluster lighting in an automobile.

In the light pipe arrangement shown in U.S. Pat. No. 5,050,946 a planar faceted back surface is used to reflect light energy, substantially uniformly, through a planar top surface. The other of the above-referenced patents show similar arrangements for coupling and distributing light energy from a light source into a planar pattern for providing LCD backlighting. Substantial improvements to the concepts shown in these patents are disclosed and described in commonly assigned U.S. patent application Ser. No. 08/601,133 entitled "Apparatus for LCD Backlighting" and U.S. patent application Ser. No. 08/782,962 entitled "Apparatus for LCD Backlighting", the disclosures of which are hereby expressly incorporated herein by reference. Still, all of these arrangements have generally been limited to planar light distribution applications.

What is needed then is a luminaire device offering greater flexibility in its construction and configuration while providing precise light distribution.

SUMMARY OF THE INVENTION

In a preferred embodiment of the present invention, a fiber optic luminaire includes an optic fiber having an outer surface, a length and a light entrance surface. A light source provides a source of light energy and is disposed adjacent the entrance surface. Light rays from the light source are coupled into the optic fiber at the entrance surface. The optic fiber conducts the light rays along its length and within the outer surface. The outer surface is formed with a plurality of non-scattering light redirecting structures. The light redirecting structures have a distribution density that varies as a function of the length. Each light redirecting structure is arranged to redirect a light ray incident to it through the outer surface.

In another preferred embodiment of the present invention, a light distribution device includes an optic fiber core. The optic fiber core has an outer surface, a length and an entrance surface. The entrance surface is arranged for coupling light rays from a light source into said optic fiber. The optic fiber is arranged for conducting the light rays along its length and within the outer surface. The outer surface is formed with a plurality of light redirecting structures, and each light redirecting structure is arranged to redirect a light ray incident to it through the outer surface. An optical capillary surrounds the optic fiber core. The optical capillary is arranged for scattering the light rays distributed from the fiber optic core.

In yet another preferred embodiment of the present invention a fiber optic luminaire includes an optic fiber core. The optic fiber core has an outer surface, a length and an entrance surface, and the entrance surface is arranged for coupling light rays from a light source into the optic fiber core. The optic fiber core is arranged to conduct the light rays along its length and within said outer surface. An optical capillary surrounds the optic fiber core. The optical capillary has an inner capillary surface and an outer capillary surface. The inner capillary surface forms an annular chamber between the fiber optic core and the optical capillary. The inner capillary surface is also formed with a plurality of light redirecting structures. Each light redirecting structure is arranged to cause a leakage of light rays from the optic fiber core adjacent the light redirecting structure, and the optical capillary is arranged for scattering the leaked light rays.

In still another preferred embodiment of the present invention, an illuminated apparatus includes an apparatus housing arranged to receive a fiber optic luminaire. The fiber optic luminaire includes an optic fiber. The optic fiber has an outer surface, a length and an entrance surface. The entrance surface is arranged for coupling light rays from a light source into said optic fiber, and the optic fiber is arranged for conducting said light rays along said length and within said outer surface. The outer surface is also formed with a plurality of light redirecting structures. Each light redirecting structure is arranged to redirect a light ray incident to it through said outer surface.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Resume

A fiber optic luminaire is arranged to couple light energy from a light source along its length. The fiber optic luminaire is also arranged with a plurality of light redirecting structures distributed along its length; the light redirecting structures are arranged to uniformly distribute light from the fiber optic luminaire. The light redirecting structures are preferably non-scattering structures, including structures such as microprisms, microfacets, microgrooves and micrometers. The fiber optic luminaire may be arranged in a variety of shapes. The fiber optic luminaire may also include an optical capillary disposed about its surface and along its length. The fiber optic luminaire and the capillary may be arranged with light reflecting and collimating structures for providing unique light distribution patterns.

2. Fiber Optic Luminaire

Figure 1:
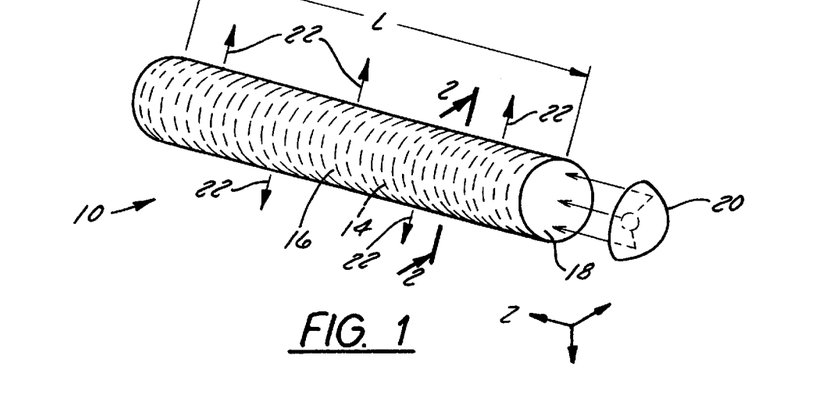
FIG. 1 is a front perspective view of a fiber optic luminaire.

Referring then to the drawings and particularly to FIG. 1 of the drawings, a fiber optic luminaire 10 in accordance with a preferred embodiment of the present invention includes an optic fiber 12 formed with a plurality of light redirecting structures 14 distributed along its length, L. Optic fiber 12 includes an outer surface 16 and an entrance surface 18. Entrance surface 18 is disposed adjacent a light source 20. Light source 20 provides a source of light energy, which light energy is coupled into optic fiber 12 at entrance surface 18 and is conducted along the length of optic fiber 12 in accordance with total internal reflection (TIR). It will be appreciated that a light energy coupler (not shown) may be used to efficiently couple light energy from light source into fiber optic luminaire 10.

Each light redirecting structure 14 is arranged to redirect a portion of the light energy conducted along optic fiber 12 and incident to redirecting structure 14 through outer surface 16. With continued reference to FIG. 1 and also referring to FIG. 2, in a preferred embodiment, light redirecting structures 14 are formed into outer surface 16. It is important to note that while shown in FIG. 2 as being located in a bottom portion of optic fiber 12, light redirecting structures 14 may be formed all around surface 16. Light redirecting structures 14 may be continuous circumferentially about surface 16, but may also be discontinuous as illustrated by the broken lines in FIG. 1. As will be described more fully below, light redirecting structures 14 are further preferably distributed relative to the length L of optic fiber 12 such that a uniform distribution of light rays 22 from fiber optic luminaire 10 is achieved. That is, light energy radiated from fiber optic luminaire 10 is uniform over its length.

Figure 2:
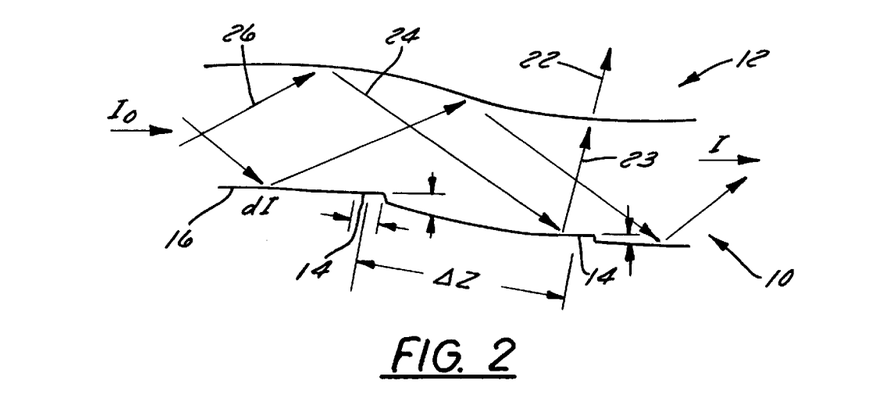
FIG. 2 is a longitudinal cross-section view taken along a portion of the fiber optic luminaire shown in FIG. 1 as indicated by line 2—2 of FIG. 1.

Light redirecting structures 14 are preferably microprism, microfacet, microgroove, or micrometer structures formed in outer surface 16, and light redirecting structures 14 are shown as microfacets in FIG. 2. In this regard, light redirecting structures 14 are non-scattering structures. Thus, a light ray 24, incident to a light redirecting structure 14 is reflected, e.g., light ray 23, without scattering, at an angle such that it is no longer internally reflected, and exits through outer surface 16 as light ray 22. Additional light rays, such as light ray 26, not incident to a light redirecting structure 14 is communicated along optic fiber 12 in accordance with TIR.

Figure 3:
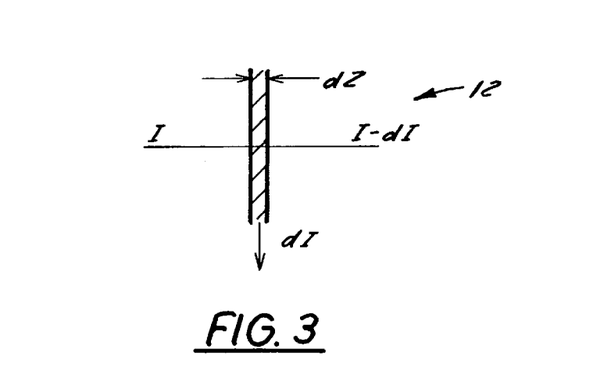
FIG. 3 is a schematic illustration of a portion of the fiber optic luminaire shown in FIG. 1 illustrating light intensity changes associated with the light redirecting structures.

A particular advantage of the present invention over light scattering optical fibers is that the light redistributing structures 14 may be distributed along the length L of optic fiber 12 to provide a uniform light distribution over the entire length of fiber optic luminaire 10, or to provide a customized light distribution having different distribution intensity at various locations along fiber optic luminaire 10. Light scattering optical fiber does not provide such control, and thus, does not provide a tunable light distribution. With continued reference to FIG. 2, light redirecting structures 14 are separated longitudinally by a separation $\Delta Z$ along optic fiber 12. In accordance with a preferred embodiment of the present invention, for uniform light distribution over the entire length of fiber optic luminaire 10, $\Delta Z$ varies as a function of position along optic fiber 12 having a total length L. Once again it should be noted that light redirecting structures do not need to be continuous about outer surface 16 at a location z, and this is illustrated by the broken lines in FIG. 1. Incident light, $I_o$, enters optic fiber 12 through entrance surface 18, and I is the intensity of the light energy after passing through a scalar distance l, and dl represents an infinitesimally small portion of the scalar distance l. FIG. 3, illustrates dl, and dI, the portion of light energy "leaked" or illuminated from optic fiber 12 as a result of light rays interacting with light redirecting structures 14. In the illustrated geometry, I is the intensity of the light energy entering at the left of optic fiber 12 reduced by dI over a length dl, which holds true for any coordinate z. A general equation (1) may be formed indicating that the leakage of light −dI must be proportional to I.

$$-dI = aI\rho dz \qquad (1)$$

The leakage of light dI is also proportional to the length dl as well as the density $\rho$ of light redirecting structures 14. The proportionality constant a is interpreted below. The density $\rho$ is the number of light redirecting structures dN per unit incremental distance dl and is given by equation 2.

$$\rho = \frac{dN}{dl} \qquad (2)$$

So the units for $\rho$ are structures/cm. The light energy intensity I is equal to $I_o$ for l=0, and $N_t$ is the total number of light redirecting structures. In order to preserve uniform light distribution, dI must be proportional only to dz. As the light energy intensity I necessarily decreases as one moves along optic fiber 12, z must correspondingly increase. In equation (3) a constant A is substituted for the value I, for the uniform distribution condition.

$$dI = -aAdz \qquad (3)$$

Since a and A are both constant, integration of equation (3) yields equation (4).

$$I = I_0 - aAdz \quad (4)$$

Equation (5) represents that the density of grooves is equal to a constant divided by equation (4), following directly then:

$$\rho = \frac{A}{I} = \frac{A}{I_0 - aAz} \quad (5)$$

Therefore, $\rho$ is a function of z and increases monotonically from an initial density $P_o$.

As mentioned, both A and a are constants, and $$-dI = aI\frac{dN}{dz}dz = aIdN \quad (6)$$

Integrating equation (6) yields equation (7).

$$I = I_o e^{-aN} \quad (7)$$

Equation (8) defines a.

$$a = \frac{\frac{-dI}{I}}{dN} \quad (8)$$

The value dI/I represents a relative leakage per infinitesimal length dl, and dN is the number of grooves per infinitesimal length dl. Thus, a is a percent distribution of light energy per light redirecting structure. If the light energy intensity I at length z=L, the full length of optic fiber 12, is desired to be 0, i.e., at the end of optic fiber 12 all light energy has been reflected through surface 16, then $$aA = \frac{I_0}{L} \quad (9)$$

Equation (9) represents a singularity because the density at the full length L cannot reach infinity. For practical purposes, it can be assumed that no more than 5% of the light energy is linked all the way to the end of optic fiber 12. For the case where 5% of the light energy remains at the end of optic fiber 12, then aN=3 as given by Equation (7).

$$aN=3 \Rightarrow I = I_o e^{-3} \approx 0.05 I_o \quad (10)$$

As noted, a higher density would result in less light energy left at the end of optic fiber 12, but this situation may be limited by the physical possibility of compacting the light redirecting structures 14. Moreover, a mirror may be placed at the end to reflect the light energy remaining at the end back toward the source.

The total number $N_t$ of light redirecting structures 14 may be represented by Equation (11) in which the length L of optic fiber 12 is divided by $\Delta Z$, the average distance between light redirecting structures 14.

$$N_t = \frac{L}{\Delta Z} \quad (11)$$

In the following example, the average length $\Delta Z$ between light redirecting structures 14 is given as 100 microns over a total optic fiber length of 20 cm yielding a total number of light redirecting structures of approximately 2000—as shown in Equation (12).

$$N_t = \frac{20 \text{ cm}}{100 \ \mu\text{m}} = \frac{200 \text{ mm}}{0.1 \text{ mm}} = 2000 \quad (12)$$

With $N_t$ known, and with $aN_t=3$, a may be calculated as is accomplished in Equation (13).

$$a = \frac{3}{2000} = 1.5(10^{-3}) = 0.0015 \quad (13)$$

The average percentage of the total light energy reflected by each light redirecting structure is thus 1.5×10−3 for the given example.

Light redirecting structures 14 have been described in terms of singular entities. It will be appreciated that light redirecting structures 14 may also represent clusters of microprisms, microfacets, microgrooves, micrometers, and various combinations thereof. In this regard, a is constant for each cluster, $\Delta Z$ is the average spacing per cluster and $N_t$ is the total number of clusters.

What should be most appreciated by the foregoing discussion is that the fiber optic luminaire has a very tunable light distribution. By controlling the total number, density, average leakage and distribution of the light redirecting structures 14, the amount of light distribution per unit length of optic fiber 12 may be controlled, and more preferably, tuned and optimized for a particular application.

Fiber optic luminaire 10 may be formed from standard fiber optic cable. A first step is to remove the cladding from the fiber optic cable to expose outer surface 16. Next, redirecting structures 14 are formed into outer surface 16 using a suitable micro-forming technology such as embossing or molding. Next, an end surface is prepared to form entrance surface 18. Entrance surface 18 is then arranged adjacent a light source 20 or another source of light energy.

Figure 4:
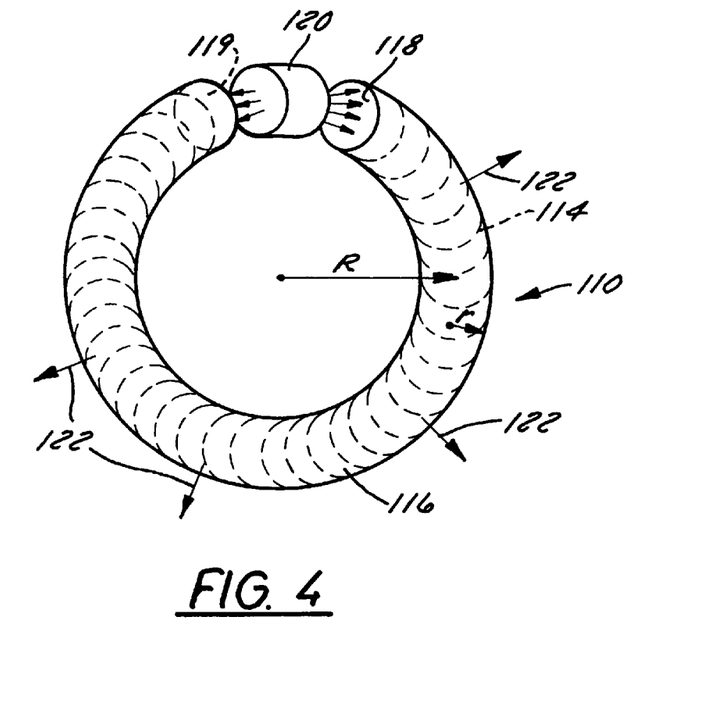
FIG. 4 is a front perspective view of a fiber optic luminaire formed in a toroid shape.

Referring now to FIG. 4, a fiber optic luminaire 110 includes an optic fiber 112 formed in a toroid shape and including a plurality of light redirecting structures 114 (shown in broken lines) distributed about its circumference. Optic fiber 112 includes an outer surface 116 and a first entrance surface 118 and a second entrance surface 119. A light source 120 is disposed between entrance surface 118 and entrance surface 119. Light source 120 provides a source of light energy, which light energy is coupled into optic fiber 112 at each of entrance surface 118 and entrance surface 119 and is conducted along the circumference of optic fiber 112 in accordance with total internal reflection (TIR). In this regard, optic fiber 112 is formed into a toroid having a radius R, and optic fiber 112 itself has a core radius r. Optic fiber 112 is preferably a multimode conductor with core radius r in the range of 100 micrometers ($\mu$m) to 1 millimeter (mm). To preserve TIR, the ratio R/r is maintained much greater than 1. It will be appreciated that a light energy coupler (not shown) may be used to efficiently couple light energy from light source 120 into fiber optic luminaire 110. Also, only one of entrance surface 118 and entrance surface 119 may be illuminated by light source 120 without departing from the scope of the present invention.

Each light redirecting structure 114 is arranged to redirect a portion of the light energy conducted along optic fiber 112 and incident to a light redirecting structure 114 through outer surface 116 in the manner described above with respect to fiber optic luminaire 10. For example, light redirecting structures 114 may have a density distribution in accordance with Equations (1)–(13) so as to obtain a uniform distribution of light rays 122 from fiber optic luminaire 110.

3. Fiber Optic Luminaire with Optical Capillary

Figure 5:
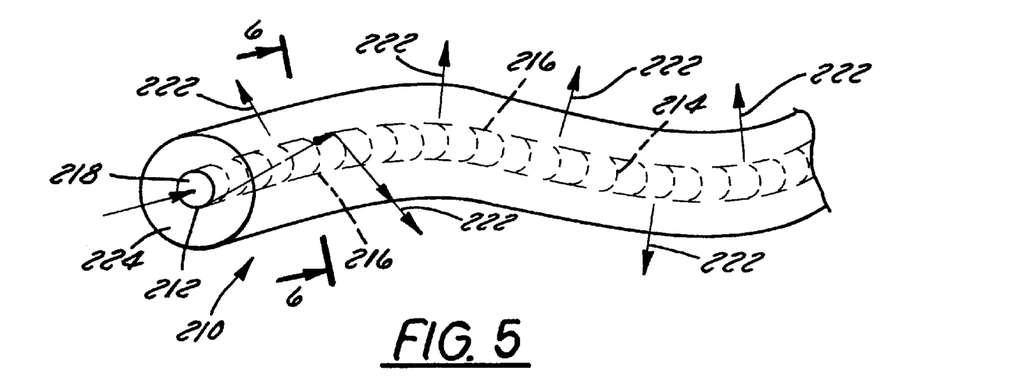
FIG. 5 is a front perspective view of a fiber optic luminaire in accordance with an alternate preferred embodiment of the present invention.

Referring now to FIG. 5, a fiber optic luminaire 210 includes an optic fiber core 212 surrounded by an optical capillary 224. Optic fiber core 212 is formed with a plurality of light redirecting structures 214 in an outer surface 216. Optic fiber core 212 further includes an entrance surface 218 disposed adjacent a source of light energy (not shown) for coupling light energy into optic fiber core 212. Light energy is conducted along fiber optic core 212 and within outer surface 216 in accordance with the TIR. A light ray, such as a light ray 226, incident to a light redirecting structure 214, however, is reflected such that it exits outer surface 216 and is conducted through optical capillary 224 as light ray 222.

Figure 6:
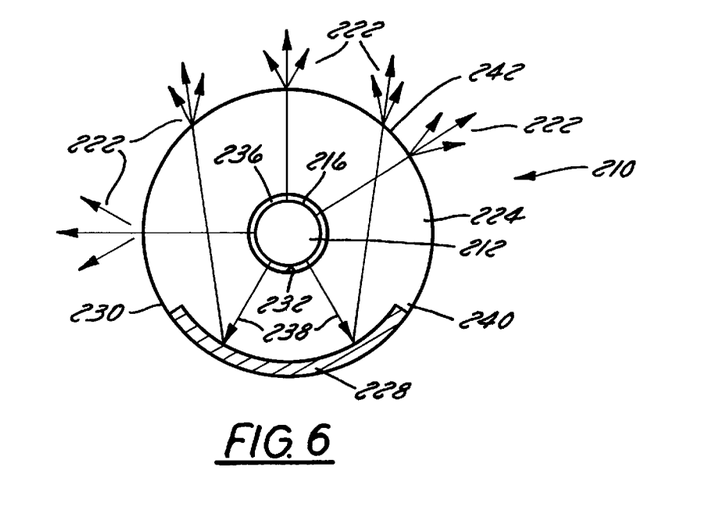
FIG. 6 is cross-section view of the fiber optic luminaire of FIG. 5 taken along line 6—6 of FIG. 5.

Referring now to FIG. 6, optical capillary 224 is formed from an optically transparent material, and further may be formed from an optically transparent material having scattering or diffusing properties. For example, optical capillary 224 is shown to scatter light rays 222 as they exit a capillary outer surface 230. To prevent unwanted coupling of light energy between optic fiber core 212 and optical capillary 224, a small gap 236, on the order of a micron, is provided between an inner capillary surface 232 of optical capillary 224 and outer surface 216 of optic fiber core 212.

Optical capillary 224 may further include a reflecting surface 228 formed along a bottom portion 240 of capillary outer surface 230 as shown in FIG. 6. In this regard, reflecting surface 228 may be formed as a reflective material deposited on outer surface 230 and/or outer surface 230 may be formed with light redirecting structures, such as microprisms, microfacets, microgrooves and micrometers. Reflecting surface 228 causes light rays 238 to be reflected at a bottom portion 240 of optical capillary 224 and exit at an upper portion 242 of optical capillary 224. In this manner, the light distribution from fiber optic luminaire 110 may be further controlled.

Figure 7:
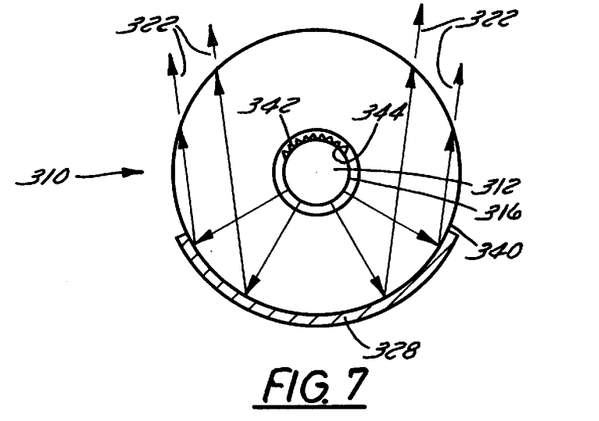
FIG. 7 is a cross-section view of an alternative arrangement of the fiber optic luminaire illustrated in FIG. 6.

With reference to FIG. 7, in an alternative configuration a fiber optic luminaire 310 includes an optic fiber core 312 and an optical capillary 324. Optic fiber core 312 and optical capillary 324 are respectively configured as discussed with respect to optic fiber core 212 and optical capillary 224 of fiber optic luminaire 210. In addition, optic fiber core 312 includes a reflecting surface 342 formed on an upper portion 344 thereof. Reflecting surface 342 may be a reflecting material deposited on a portion of an outer surface 316 of fiber optic core 312 or may be light redirecting structures formed in outer surface 316 and arranged to direct light rays downward, as shown in FIG. 7, from optic fiber core 312. In addition, optical capillary 324 includes a reflecting surface 328 formed at a bottom portion 340 thereof. Preferably, reflecting surface 328 is arranged as a collimating reflecting surface for collimating light rays incident thereon. Likewise, optical capillary 324 is formed from a non-scattering optically transparent material. In this regard, fiber optic luminaire 310 provides a source of collimated light rays 322.

Figure 8:
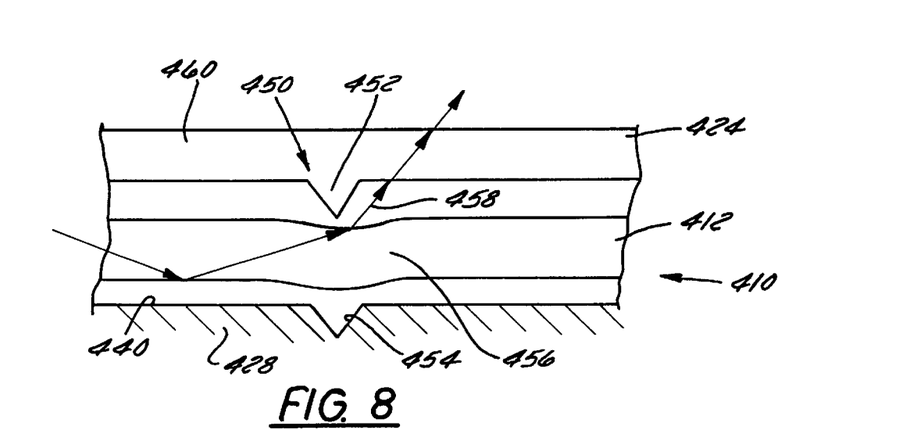
FIG. 8 is a longitudinal cross-section view of a fiber optic luminaire in accordance with an alternate preferred embodiment of the present invention.

Referring now to FIG. 8, an alternative preferred embodiment fiber optic luminaire 410 includes an optic fiber core 412 and an optical capillary 424. Optic fiber core is not formed with light redirecting structures. Instead, optical capillary 424 is formed with a light redirecting structure 450 including a projection 452 and a corresponding indentation 454 formed in an inner capillary surface 432 (not shown). Projection 452 and indentation 454 causes a local distortion 456 in optic fiber 412. Local distortion 456 causes localized leakage of light rays 458 from optic fiber 412. Light rays 458 are conducted through an optically transparent upper portion 460 of optical capillary 424. A bottom portion 440 is formed as a reflecting surface 428 similar in arrangement to reflecting surfaces 228 or 328 discussed above. In this manner, standard fiber optic cable may be used to form optic fiber 412 without further modification.

One of ordinary skill in the art will immediately appreciate from the foregoing discussion that the present invention offers tremendous flexibility. For example, very precise and uniform light distribution may be obtained from the optic fiber core of the fiber optic luminaire that is not obtainable from light scattering fiber optic cable. Thus, a very uniform, and/or tailored or "tuned", light distribution pattern from the optic fiber core may be obtained. Additionally, a diffused, collimated, and/or a concentrated light distribution may be obtained by arranging an optical capillary made from scattering or diffusing optically transparent materials and providing selectively located reflecting surfaces.

4. Fiber Optic Luminaire Formed from Planar Material

Figure 9:
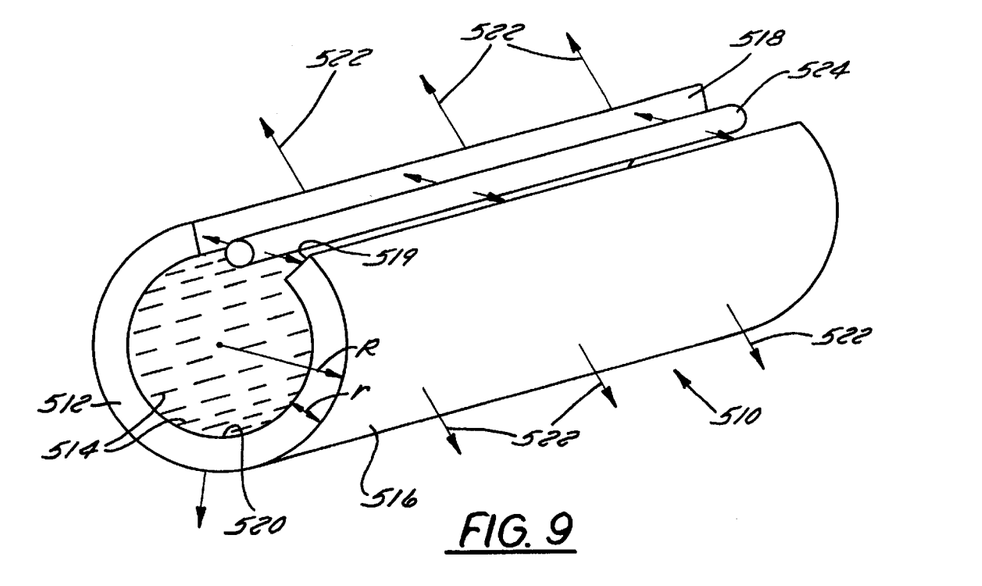
FIG. 9 is a front perspective view of a fiber optic luminaire in accordance with an additional alternate preferred embodiment of the present invention.

With reference now to FIG. 9, a fiber optic luminaire 510 is formed from a planar portion of optically conductive material formed into an annulus 512. In this regard, fiber optic luminaire 510 includes an inner surface 520 and an outer surface 516. Inner surface 520 is formed with a plurality of axially oriented light redirecting structures 514, such as microprisms, microfacets, microgrooves and/or micrometers. Fiber optic luminaire 510 further includes an axial gap 522 defining a first entrance surface 518 and a second entrance surface 519. A light source 524 is disposed along axial gap 522 and provides a source of light energy. The light energy is coupled into annulus 512 via entrance surfaces 518 and 519 and is conducted along annulus 512 according to TIR. Annulus 512 is formed to a radius R and has a thickness r. In order to maintain TIR, the ratio R/r is maintained much greater than 1. In this manner, light rays are retained within and conducted radially about annulus 512 according to TIR. A light ray incident to a light redirecting structure 514 is reflected, without scattering, through outer surface 516 as a light ray 522. In a preferred arrangement, light redirecting structures 514 are distributed in accordance with Equations (1)–(13) for providing a uniform light distribution.

Figure 10:
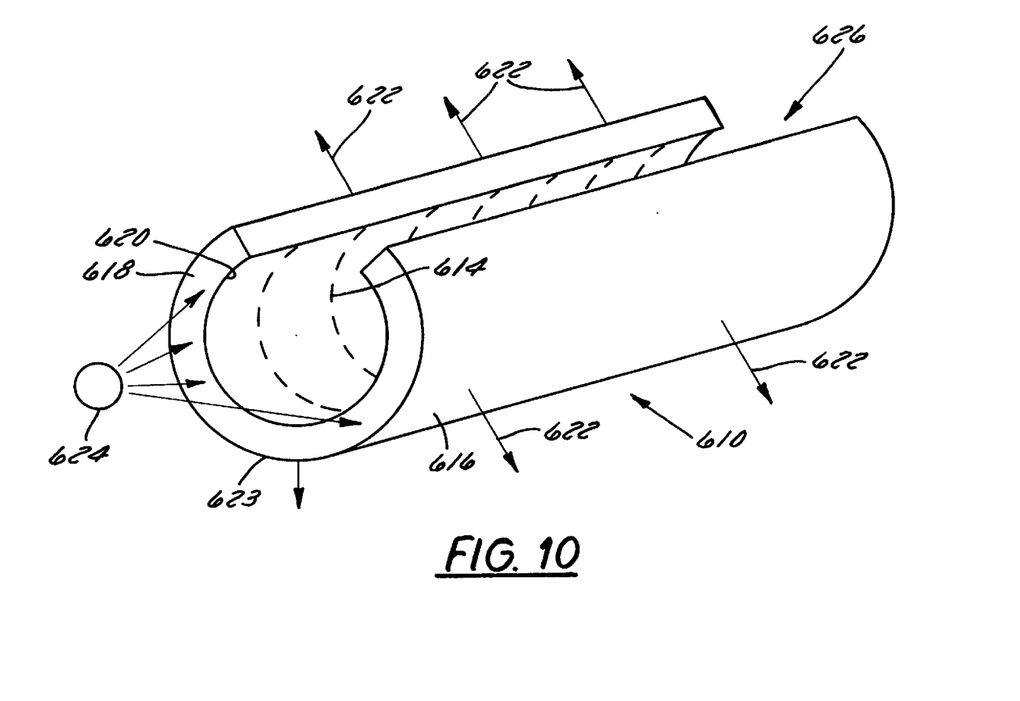
FIG. 10 is a front perspective view of a fiber optic luminaire in accordance with an alternate preferred embodiment of the present invention.

With reference to FIG. 10, and alternative arrangement fiber optic luminaire 610 is formed from a planar portion of optically conductive material formed into an annulus 612. In this regard, fiber optic luminaire 610 includes an inner surface 620 and an outer surface 616. Inner surface 620 is formed with a plurality of radially oriented light redirecting structures 614, such as microprisms, microfacets, microgrooves and/or micrometers. An end 622 is formed with an entrance surface 618. A light source 624 is disposed adjacent end 622 and provides a source of light energy. The light energy is coupled into annulus 612 at entrance surface 618 and coupled axially along annulus 612 according to TIR. Annulus 612 is formed to a radius R and has a thickness r. In order to maintain TIR, the ratio R/r is maintained much greater than 1. In this manner, light rays are retained within and conducted axially along annulus 612 according to TIR. A light ray incident to a light redirecting structure 614 is reflected, without scattering, through outer surface 616 as a light ray 622. In a preferred arrangement, light redirecting structures 614 are distributed in accordance with Equations (1)–(13) for providing a uniform light distribution. It will be appreciated that according to a particular application, axial gap 626 may be minimized such that fiber optic luminaire 610 is a substantially continuous annular cylinder.

5. Fiber Optic Luminaire Applications

Figure 11:
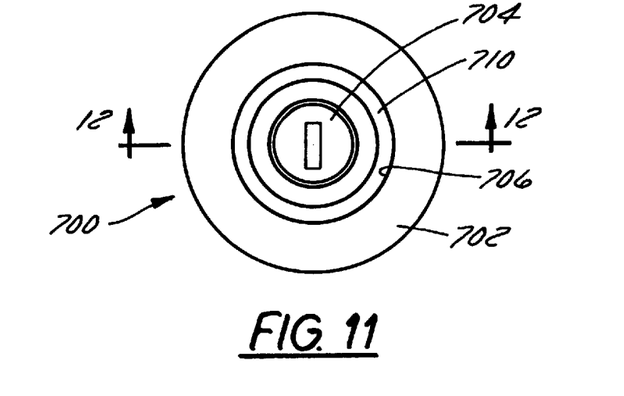
FIG. 11 is a front view of a lock-cylinder arranged with a fiber optic luminaire.
Figure 12:
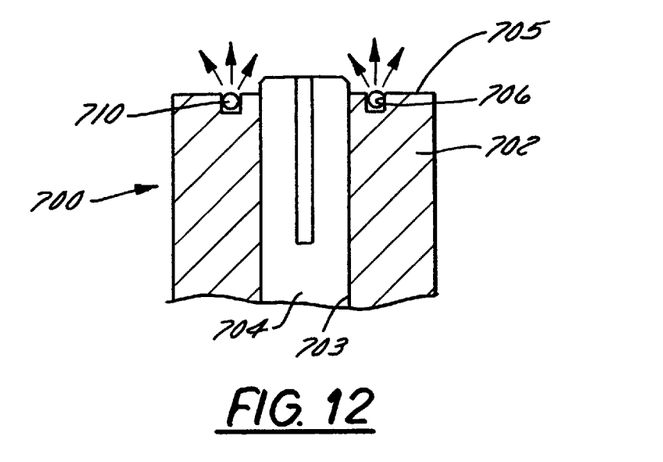
FIG. 12 is a cross-section view of the lock-cylinder shown in FIG. 11 taken along line 12—12 of FIG. 11.

Referring now to FIGS. 11 and 12, lock assembly 700 includes a fiber optic luminaire 710 constructed in accordance with preferred embodiments of the present invention. Lock cylinder 700 includes a housing 702 formed with a through bore 703 into which a lock cylinder 704 is secured. At an end 705 housing 702 includes an annular recess 706 into which fiber optic luminaire 710 formed in a toroid shape is secured. Fiber optic luminaire 710 is constructed in accordance with preferred embodiments of the present invention. In this manner, fiber optic luminaire 710 includes an optic fiber core formed with a plurality of light redirecting structures and a light entrance surface coupled to a light source. Lock assembly 700 may preferably be adapted for use in an automobile or in other locking applications where it is desirable to illuminate lock cylinder 704 for the user.

Figure 13:
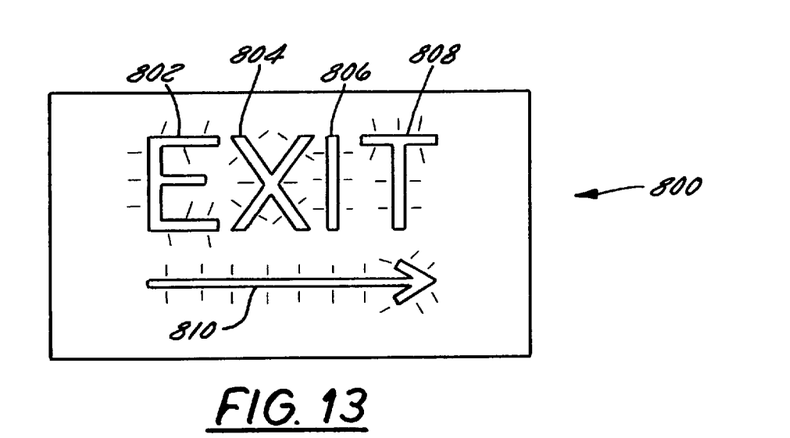
FIG. 13 is a front view of an illuminated sign arranged with several fiber optic luminaires.

In FIG. 13, an illuminated sign 800 is shown adapted with a plurality of fiber optic luminaires 802–810. Each of fiber optic luminaires 802–810 are formed into the shape of an illuminated letter and/or indicator, such as the letters "E", "X", "I" and "T" corresponding respectively to fiber optic luminaires 802–808 and an arrow shape corresponding to fiber optic luminaire 810. Each fiber optic luminaire 802–810 is constructed in accordance with preferred embodiments of the present invention. In this manner, each fiber optic luminaire includes a fiber optic core, a plurality of light redirecting structures formed in an outer surface thereof, an entrance surface formed on the fiber optic core and coupled to a light source. For sign 800, preferably a single light source is provided and suitably coupled, such as by fiber optic cable, to each fiber optic luminaire 802–810.

Many changes and modifications could be made to the invention without departing from the fair scope and spirit thereof. The scope of some changes is discussed above. The scope of others will become apparent from the appended claims.

We claim:

1. A fiber optic luminaire comprising:
   an optic fiber, the optic fiber having an outer surface, a length and an entrance surface, the entrance surface arranged for coupling light rays from a light source into said optic fiber and said optic fiber arranged for conducting said light rays along said length and within said outer surface; and
   said outer surface being formed with a plurality of light redirecting structures, said light redirecting structures having a distribution density, said distribution density varying as a function of said length, and each said light redirecting structure arranged to redirect a light ray incident to said light redirecting structure through said outer surface.

2. The fiber optic luminaire of claim 1, wherein each said light redirecting structure comprises one of the group consisting of: a microprism, a microgroove, a microfacet and a micrometer.

3. The fiber optic luminaire of claim 1, wherein each said light redirecting structure comprises a non-scattering light redirecting structure.

4. The fiber optic luminaire of claim 1, wherein said distribution density is proportional to said length.

5. The fiber optic luminaire of claim 4, wherein each said light redirecting structure is arranged to redirect a fixed percentage, a, of said light rays.

6. The fiber optic luminaire of claim 1, wherein said optic fiber is formed in a toroid.

7. The fiber optic luminaire of claim 6, said optic fiber further comprising a second entrance surface opposing said entrance surface, and said second entrance surface arranged for coupling light rays from said light source into said optic fiber at said second entrance surface.

8. The fiber optic luminaire of claim 1, said optic fiber further comprising a second entrance surface, and said second entrance surface arranged for coupling light rays from a second light source into said optic fiber at said second entrance surface.

9. The fiber optic luminaire of claim 1, wherein said optic fiber is formed into one of the group consisting of a letter shape, a number shape and an arrow shape.

10. The fiber optic luminaire of claim 9, wherein said fiber optic luminaire forms part of an illuminated sign.

11. A light distribution device comprising:
    an optic fiber core, said optic fiber core having an outer surface, a length and an entrance surface, the entrance surface arranged for coupling light rays from a light source into said optic fiber and said optic fiber arranged for conducting said light rays along said length and within said outer surface, and said outer surface being formed with a plurality of light redirecting structures, each said light redirecting structure having a distribution density, said distribution density varying as a function of said length, and arranged to redirect a light ray incident to said light redirecting structure through said outer surface, and
    an optical capillary surrounding said optic fiber core, said optical capillary arranged for scattering said light rays redirected through said outer surface.

12. The light distribution device of claim 11, wherein said optical capillary comprises a reflecting member.

13. The light distribution device of claim 11, wherein said optical capillary has an annular shape having an inner capillary surface adjacent said outer surface and an outer capillary surface.

14. The light distribution device of claim 13, wherein said outer capillary surface comprises a reflecting member.

15. The light distribution device of claim 14, wherein said reflecting member is formed in an arc of less than 180°.

16. The light distribution device of claim 15, wherein each said light redirecting structure is arranged to redirect a light ray toward said reflecting member.

17. The light distribution device of claim 16, wherein said reflecting member is a collimating member.

18. The light distribution device of claim 11, wherein said light redirecting structures have a distribution density, said distribution density varying as a function of said length.

19. The light distribution device of claim 18, wherein each said light redirecting member is arranged to redirect a constant percentage, a, of said light rays.

20. The light distribution device of claim 11, wherein said light distribution device is formed in a toroid.

21. The light distribution device of claim 20, wherein said optic fiber comprises a second entrance surface opposing said entrance surface, and said second entrance surface arranged for coupling said light rays from said light source into said optic fiber at said second entrance surface.

22. The light distribution device of claim 11, said optic fiber further comprising a second entrance surface, said second entrance surface arranged for coupling light rays from a second light source into said optic fiber at said second entrance surface.

23. The light distribution device of claim 11, wherein said light distribution device is formed into one of the group consisting of a letter shape, a number shape and an arrow shape.

24. The light distribution device of claim 23, wherein said light distribution device forms part of an illuminated sign.

25. A fiber optic luminaire comprising:
- an optic fiber core, said optic fiber core having an outer surface, a length and an entrance surface, the entrance surface arranged for coupling light rays from a light source into said optic fiber core and said optic fiber core arranged for conducting said light rays along said length and within said outer surface;
- an optical capillary surrounding said optic fiber core, said optical capillary having an inner capillary surface and an outer capillary surface, said inner capillary surface forming an annular chamber between said outer surface and said optical capillary;
- said inner capillary surface being formed with a plurality of light redirecting structures, said light redirecting structures having a distribution density varying as a function of length, and each said light redirecting structures arranged to cause a leakage of the light rays from said optic fiber core adjacent said light redirecting structure, and said optical capillary arranged for scattering said leaked light rays.

26. The fiber optic luminaire of claim 25, wherein said optical capillary is formed with a reflective member.

27. The fiber optic luminaire of claim 26, wherein said reflective member comprises a metallized portion of said optical capillary.

28. The fiber optic luminaire of claim 27, wherein said reflective member is formed in an arc of less than 180°.

29. The fiber optic luminaire of claim 25, wherein said optic fiber core comprises a second entrance surface, said second entrance surface arranged to couple light rays from a second light source into said optic fiber core.

30. An illuminated apparatus, said illuminated apparatus including an apparatus housing arranged to receive a fiber optic luminaire, said fiber optic luminaire comprising:
- an optic fiber, the optic fiber having an outer surface, a length and an entrance surface, the entrance surface arranged for coupling light rays from a light source into said optic fiber and said optic fiber arranged for conducting said light rays along said length and within said outer surface; and
- said outer surface being formed with a plurality of light redirecting structures, said light redirecting structures having a distribution density varying as a function of said length, each said light redirecting structures arranged to redirect a light ray incident to said light redirecting structure through said outer surface.

31. The illuminated apparatus of claim 30, wherein each said light redirecting structure comprises one of the group consisting of a microprism, a microgroove, a microfacet and a micrometer.

32. The illuminated apparatus of claim 30, wherein each said light redirecting structure comprises a non-scattering light redirecting structure.

33. The illuminated apparatus of claim 30, wherein said light redirecting structures have a distribution density, said distribution density varying as a function of said length.

34. The illuminated apparatus of claim 33, wherein said distribution density is proportional to said length.

35. The illuminated apparatus of claim 34, wherein each said light redirecting structure is arranged to redirect a fixed percentage, a, of said light rays.

36. The illuminated apparatus of claim 30, wherein said apparatus comprises one of the group consisting of a lock cylinder, a control knob, a switch, an actuator and a lever.

37. The illuminated apparatus of claim 36, wherein said apparatus is arranged for use in association with a motor vehicle.

38. The illuminated apparatus of claim 30, said optic fiber further comprising a second entrance surface, said second entrance surface arranged for coupling said light rays from a second light source into said optic fiber at said second entrance surface.

39. The illuminated apparatus of claim 30 further comprising an optical capillary surrounding said optic fiber.

40. The illuminated apparatus of claim 39, wherein said optical capillary is arranged for scattering said light rays redirected through said outer surface.

41. The illuminated apparatus of claim 40, wherein said optical capillary comprises a reflecting member.

42. The illuminated apparatus of claim 39, wherein said optical capillary has an annular shape having an inner capillary surface adjacent said outer surface and an outer capillary surface.

43. The illuminated apparatus of claim 42, wherein said outer capillary surface comprises a reflecting member.

44. The illuminated apparatus of claim 43, wherein said reflecting member is formed in an arc of less than 180°.

45. The illuminated apparatus of claim 43, wherein each said light redirecting structure is arranged to redirect a light ray toward said reflecting member.

46. The illuminated apparatus of claim 43, wherein said reflecting member is a collimating member.

* * * * *